Patented Aug. 6, 1929.

1,723,075

UNITED STATES PATENT OFFICE.

ARTHUR W. REYNOLDS, OF LEONARDSVILLE, NEW YORK, ASSIGNOR TO THE BABCOCK MANUFACTURING COMPANY, OF LEONARDSVILLE, NEW YORK, A CORPORATION OF NEW YORK.

CULTIVATOR.

Application filed May 14, 1927. Serial No. 191,325.

My invention refers to new and useful improvements in cultivators of the type used for tilling soil, with relation to and more particularly between rows of growing plants, and has for its object to simplify and cheapen the cost of constructing certain parts, thus simplifying the assembling and cost of producing the cultivator.

The invention further and more particularly relates to what is commercially known as a walking cultivator, which includes a lever spread for adjusting the side beams carrying the side teeth.

The object of the invention is to provide a one piece yoke or hinge member for attachment to the center beam and to which the forward ends of the hinged side beams are hingedly attached. Yokes or hinge members for this purpose have heretofore been made of several parts which required to be assembled and attached to the beam in a way to cost considerable more than the form of yoke herein to be described.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size, and minor details of construction within the scope of the claims may be resorted to without departure from the spirit, or sacrificing any of the advantages of the invention.

Similar characters of reference denote like or corresponding parts throughout the several Figures of the accompanying drawing forming a part of this specification and upon which Fig. 1 shows a perspective view of a modern commercial type of five toothed, lever spread, plain walking cultivator.

Figure 1:
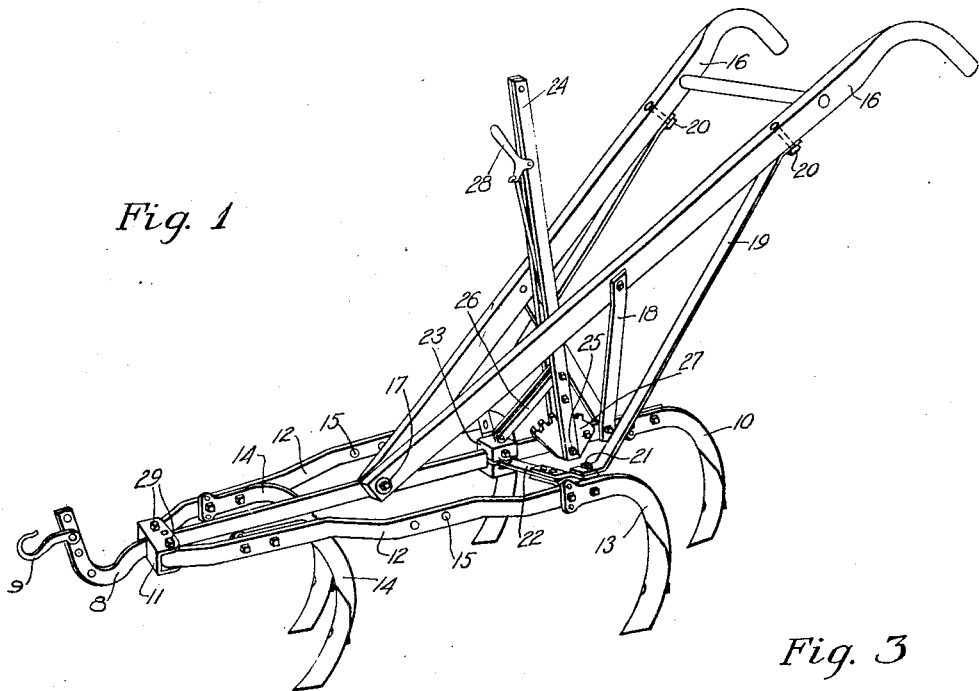

As before explained I have shown in Fig. 1 of the drawing a perspective view of a complete five tooth, lever spread, walking cultivator which I will now refer to by reference characters in the further description of the cultivator and my invention as applied thereto.

In the drawings:

8 represents the forward end of the center beam of the cultivator which carries a hook 9 to which a whiffle tree may be attached. The center beam extends longitudinally through the center portion of the cultivator and has a shank 10 attached to its rear end, to carry a cultivator tooth. Upon the forward end of this center beam is a yoke 11 to which the side beams 12—12 are hingedly connected. These side beams like the center beam, each have shanks 13 attached thereto for the support of a cultivator tooth.

A shank 14 is attached to the forward end portion of each of these side beams, and likewise each carries a cultivator tooth. Provision is also made for the attachment of an additional shank and cultivator tooth to each of the side beams if desired as is apparent by reference to the hole 15 in said side beams. 16 represents handle members, usually made of wood, the lower end of which are secured as at 17 to the center beam. These handle members are further each provided with a brace 18, one end of which is attached to the intermediate portion of the handle and the other ends to the center beam.

A link 19 is hingedly connected to a bolt 20 secured in the upper end portion of each handle. The lower end of these links are pivotally connected as at 21 to a horizontally disposed link 22. There being two of said links 19 and two of the horizontal links 22, the latter having their inner ends connected to a slide 23 slidably mounted upon the center beam, and their outer ends pivotally connected to the rear end portion of the side beams 12—12, said side beams being adapted to be drawn in toward, or spread away from the center beam by means of a sliding movement of the slide 23 on the center beam. This sliding movement of the slide which serves to contract and spread the side beams is effected through an operating handle 24 pivotally connected to the center beam at 25 and operatively connected with the said slide by a link 26, one end of which link is pivotally connected to the lever and the other end similarly connected to the slide.

A toothed segment 27 secured to the center beam, together with a spring actuated pawl carried by the operating lever and manipulated by the trigger 28, serves to hold the operating lever, the connected slide, and side beams in their adjusted positions.

The cultivator thus described with the exception of the yoke 11 hereinbefore referred to is a commercial type of cultivator, manufactured by applicant. This yoke, which I will now proceed to describe in detail, comprises the essential feature of my present invention, and is of vast importance, since it works out to advantage in practice and cheapens the cost of producing a cultivator of this sort.

This yoke is obviously designed for permanent attachment to the center beam 8 of the cultivator and while it is possible to secure it in various ways, I have shown and prefer to employ the simple form illustrated in the drawings. The yoke, so-called, is made of one piece, preferably blanked and shaped from sheet metal and as will be seen, comprising a housing adapted to form a front end portion $a$, a top plate member $b$ and a bottom plate member $c$. The two said plate members being in practice, disposed horizontally and crosswise of the upper and lower edges respectively of the center beam.

Figure 2:
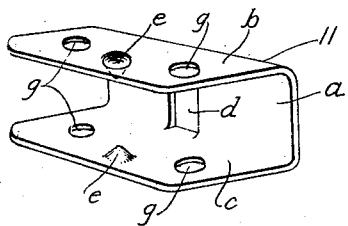
Fig. 2 shows an enlarged perspective view of my improved form of yoke used in the make-up of the cultivator shown in Fig. 1.
Figure 5:
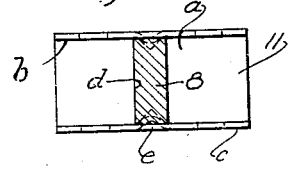
Fig. 5 is a sectional elevation somewhat like Fig. 3 but with bolts and side beams removed.

The yoke further includes a central opening $d$ in the front portion $a$ which is of proper size and shape to receive the center beam which in practice extends through the opening. When made of sheet metal, as is my preference, the yokes may conveniently be attached to the center beam 8, by punching in one or more tits $e$ from the upper and lower plates $b$ and $c$ after the yoke has been positioned in the center beam and in alignment with the top and bottom edges of the center beam as shown in Figs. 1, 2 and 5, so that the portions $e$ of metal will be positioned in the previously formed holes in said beam in a way to secure the yoke to the beam with the setting of the nuts on the bolts.

Figure 3:
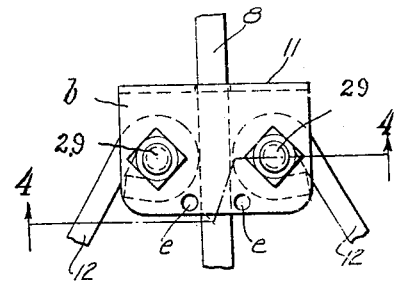
Fig. 3 shows an enlarged plan view of the yoke as applied to the center cultivator beam and having forward end portions of side beams hingedly attached thereto.
Figure 4:
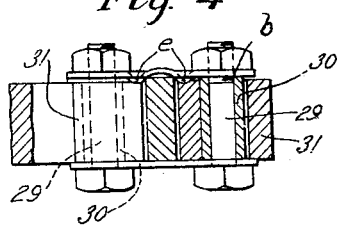
Fig. 4 shows a sectional elevation taken on line 4—4 of Fig. 3.
Figure 6:
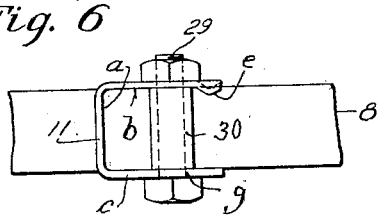
Fig. 6 shows a side elevation of center beam with yoke carrying pivotal bolts attached.

In Figs. 3 and 4, the punched tits $e$ are positioned on either side of, and adjacent to the top edge of the beam so that the metal is forced against the corners of the top edge of the beam in a way to secure the yoke in position upon the beam.

This yoke further includes two pairs of aligned holes $g$—$g$ for the support of pivotal bolts 29, located in spaced relation to the center beam and each other. Each of said bolts is provided with a sleeve 30 positioned between the upper and lower plate member $b$ and $c$ and through which the said bolts pass. These sleeves form fixed pivotal bearings that extend through the eye 31 of the side beam 12 for their hinged connection to the yoke. In this connection it will be noted that the length of these bearings is slightly more than that of the height of the side beams so as to insure clearance and free movement of the eyes of the side beams upon their pivots and between the upper and lower plates.

In the assembling of the parts the nuts attached to the bolts 29 when securely tightened draw the upper and lower plate members of the yoke up tight against the ends of the sleeve, thus holding the latter together with the bolts, rigid within the yoke.

My improved form of yoke as constructed and as hereinbefore described, comprises but and including the two bolts and nuts, five parts, being one-half the number of parts heretofore employed, and consequently, its attachment and assembling likewise requires very much less time, thus insuring a saving in the cost of a cultivator of this type.

Having thus described my invention, what I claim and desire to secure by Letters Patent is:

1. A yoke for attachment to cultivator beams, formed of a single piece of metal comprising in part, upper and lower opposed plate member and means integral with the yoke for securing it to said beam.

2. The combination with a cultivator beam, of a yoke formed of a single piece of metal and including an opening to receive the beam, and means integral with the yoke to engage the beam, to secure the two together.

3. The combination with a cultivator beam, of a one piece yoke having an opening therein to receive the beam and having integral means to engage and secure the yoke to the beam, and including opposed plate members, and pivotal bolts passing through said plate members at each side of the beam.

4. A yoke for a cultivator including an opening to receive a cultivator beam and having means to secure said yoke to the beam, and including aligned holes in opposite plate portions of the yoke, sleeves positioned between said portions and in alignment with the holes, bolts positioned in the holes and sleeves, in a way to secure the said opposite plate portions of the yoke against the ends of the sleeves, and side beams hingedly connected to said sleeves.

Signed at Bridgeport, in the county of Fairfield and State of Connecticut, this 7th day of May A. D., 1927.

ARTHUR W. REYNOLDS.